Sept. 20, 1927.  G. E. DEAN  1,643,201

DREDGER

Filed Aug. 28, 1924

Inventor
George Edgar Dean.
by Popp and Powers
Attys.

Patented Sept. 20, 1927.

1,643,201

UNITED STATES PATENT OFFICE.

GEORGE EDGAR DEAN, OF SCRANTON, PENNSYLVANIA.

DREDGER.

Application filed August 28, 1924. Serial No. 734,778.

This invention relates to improvements in dredgers for salts or spices.

The object of the invention is to provide a dredger which combines the advantages of preserving the strength or aroma and the dryness of its contents, of being used with the same facility as a dredger of ordinary construction, of permitting a regulation, according to choice, of the flow of the powdered material, and of being of simple construction.

The invention is illustrated in the accompanying drawing, wherein.

Figure 1:
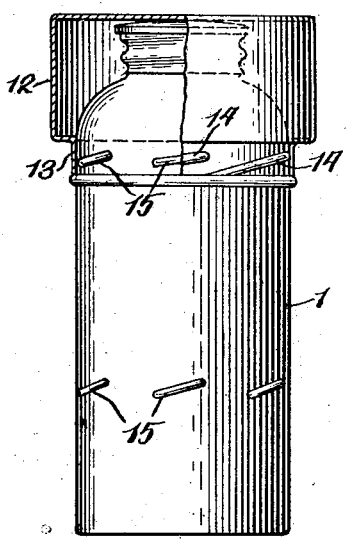
Figure 1 is a side elevation, partly in section, showing the dredger when not in use.
Figure 2:
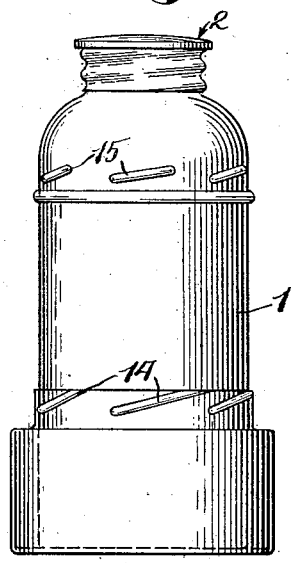
Figure 2 is a side elevation showing the dredger ready for use.
Figure 3:
Figure 3 is a view, partly in elevation and partly in section of the regulating cap.
Figure 4:
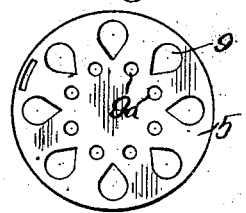
Figure 4 is a plan view of the outer member of the regulating cap.
Figure 5:
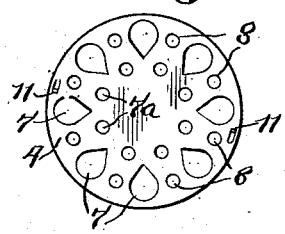
Figure 5 is a plan view of the inner member of the regulating cap.
Figure 6:
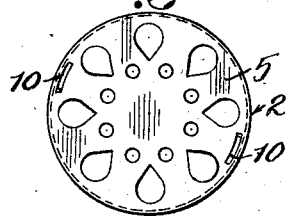
Figures 6 and 7 are plan views of the regulating cap in its different adjustments.
Figure 7:
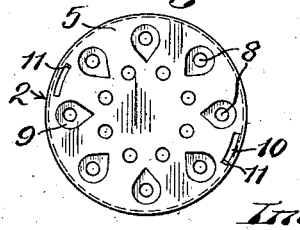

The dredger consists of a cylindrical body 1 having at its upper end a reduced extension upon which is removably fitted a regulating cap 2, the same preferably having threads 3 by which it is mounted. The cap 2 preferably consists of inner and outer members 4 and 5, the inner member being stationary and the outer member being rotatable and connected to the inner member in any suitable manner, as by a marginal overturned flange 6 having a knurled face and which engages over the edge of the outer member. The inner member is formed with a series of openings 7 and 7ª and another series of openings 8, the openings 7 and 7ª passing a greater amount of material than the openings 8. The outer member is formed with a series of openings 9 and 9ª. In the first position of the outer member, as shown in Figure 6, its openings 9 and 9ª register with the openings 7 and 7ª, respectively, and the openings 8 are covered. In the second position of the outer member, as shown in Figure 7, the openings 9 register with the openings 8 and the openings 7 and 7ª are covered. In this way a selection of the quantity of material discharged is permitted, the first position of the outer member giving a free flow of a greater quantity of material and the second position of the outer member giving a free flow of a less quantity of material. The movement of the outer member to either of the two positions described is suitably limited as by forming the outer member with slots 10 adjacent its circumference and by forming the inner member with lugs 11 which project through the slots 10 and by engagement with the ends of said slots limit the turning movement of the outer member.

The regulating cap is normally enclosed in a cover 12 which has a close surrounding fit upon the cylindrical body 1 and may be removably connected to either end of said body. The cover 12 is preferably of greater diameter than the body 1 and is provided with a reduced cylindrical portion 13 which fits upon said body. The quick and easy connection and disconnection of the cover 12 and body 1 is provided for by means of steep-pitched co-operating threads, those on the cover being shown at 14 and those on the body at 15 and being arranged adjacent the upper and lower ends of the body.

When the dredger is not in use the cover 12 is fitted at the upper end thereof and encloses the regulating cap, thereby to protect the contents of the dredger against such deterioration as might result from constant exposure to air, such as the loss of strength or aroma, or formation of lumps due to absorption of moisture.

When it is desired to use the dredger the cover is removed from the upper end of the body 1 and fitted on the lower end of said body and is thus always at hand for replacement when the use of the dredger is no longer required. By thus using the cover as a closure it is unnecessary to provide for a closed position of the rotatable member of the regulating cap from which it follows that the rotatable member is simply moved from one open position to a position of greater opening and that an equally free flow of the material is permitted in either case.

Having fully described my invention, I claim:

1. A dredger consisting of a container having a perforated discharge cap, a cover fitted over said discharge cap and means comprising elements provided on the cover and elements at each end of the container to cooperate with said elements on the cover in providing for the quick attachment and removal of the cover with respect to either end of the container, the cover being thereby applicable to the top of the container when the dredger is not in use and to the bottom of the container when the dredger is in use.

2. A dredger consisting of a cylindrical body having a reduced discharge end, a perforated cap fitted on said discharge end, a removable cover and means for securing said cover embodying elements provided on said cover and companion elements provided in two series, one adjacent the top of said body and the other adjacent the bottom of said body whereby said cover may be fitted and secured on either the upper end or the lower end of said body as and for the purpose set forth.

In testimony whereof I affix my signature.

GEORGE EDGAR DEAN.